(12) United States Patent
Lagares Corominas

(10) Patent No.: US 6,595,846 B1
(45) Date of Patent: Jul. 22, 2003

(54) MACHINE FOR THE TREATMENT OF MEAT PIECES

(75) Inventor: Narciso Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 0 days.

(21) Appl. No.: 09/701,867

(22) PCT Filed: Jun. 3, 1999

(86) PCT No.: PCT/ES99/00162

§ 371 (c)(1), (2), (4) Date: Feb. 20, 2001

(87) PCT Pub. No.: WO99/63832

PCT Pub. Date: Dec. 16, 1999

(30) Foreign Application Priority Data

Jun. 5, 1998 (ES) ............................................. 9801303

(51) Int. Cl.[7] ................................................. A22C 9/00
(52) U.S. Cl. ......................................................... 452/141
(58) Field of Search ........................ 452/141; 100/910; 99/472, 535; 366/44, 45, 185

(56) References Cited

U.S. PATENT DOCUMENTS

| | | | | |
|---|---|---|---|---|
| 1,856,728 A | * | 5/1932 | Robb ........................... 280/838 |
| 4,501,499 A | * | 2/1985 | Boan et al. ................ 366/156.1 |
| 4,791,705 A | | 12/1988 | Corominas .................. 452/141 |
| 4,836,099 A | * | 6/1989 | Thirode ......................... 99/472 |
| 4,994,294 A | * | 2/1991 | Gould .......................... 426/519 |
| 5,104,232 A | * | 4/1992 | Lennox, III .................. 366/139 |
| 5,323,694 A | * | 6/1994 | Higashimoto ................ 366/139 |
| 5,492,499 A | * | 2/1996 | Van Haren et al. ......... 366/337 |
| 5,564,332 A | * | 10/1996 | Ludwig ........................ 366/139 |
| 5,692,382 A | * | 12/1997 | Davison ........................ 62/345 |
| 5,947,015 A | * | 9/1999 | Laurbak ....................... 99/535 |
| 6,007,418 A | * | 12/1999 | Suhner ......................... 366/131 |

FOREIGN PATENT DOCUMENTS

| | | | |
|---|---|---|---|
| DE | 3838323 A | * | 5/1990 |
| DK | WO 96/36233 | * | 11/1996 |
| EP | 455611 | * | 11/1991 |
| EP | 584853 | * | 3/1994 |
| EP | 0 600 566 | | 6/1994 |
| JP | 6-54642 | * | 3/1994 |
| SU | 902696 | | 2/1982 |

* cited by examiner

Primary Examiner—Peter M. Poon
Assistant Examiner—David J Parsley
(74) Attorney, Agent, or Firm—Jacobson Holman PLLC

(57) ABSTRACT

A machine including a drum having a closed rear extremity and an open front extremity for loading/unloading meat pieces, the drum bearing on rollers of a support structure and being coupled to a structure for its rotation in both directions. The structure being hinged to a bench and associated to oblique fluidodynamic cylinders, for rocking purposes. The drum has internal vanes intended to carry away and tumble the meat. The bench is a frame resting on the ground, and the structure has at its front part hinges connected to the bench, horizontally aligned and close to the ground. At its rear part the structure is connected to a plate carrying a device for the rotation and guiding of the drum. Elastic elements are aligned along a horizontal axis, secant to the rotation axis, behind the closed end of the drum.

10 Claims, 3 Drawing Sheets

MACHINE FOR THE TREATMENT OF MEAT PIECES

FIELD OF THE INVENTION

This invention relates to a machine for processing meat pieces, namely for macerating and treating meat pieces or blocks such as cured ham, fresh meat or other meat products which in many cases have been previously injected with brine or other preserving or improving product, the processing of which comprises massaging actions by rubbing the meat pieces with each other and with the walls and alternatively strongly knocking them which are lifted for said purpose and left to fall from a certain height on the rest of the meat mass.

BACKGROUND OF THE INVENTION

The machine involved is of the type which comprises a large drum of any suitable section, in general cylindric, which has a side wall, a closed rear end and an open front end, to supply the meat pieces which fill it up to about 40% its capacity, and for unloading them, said drum showing means for rotating in two directions, about its centerline, said axis being horizontally oriented during the step of treatment and being provided with a cover with tight closing means which have available a driving mechanical device. Preferably, said drum has integrated, surrounding its side wall, means such as a thermal conditioning sleeve which allow to carry out an adjustment of the meat mass temperature at will, during the step of maceration, as well as other means of access to the interior of the drum, to carry out alternative steps of vacuum and pressurized air or oxygen blowing (overpressure), of variable duration, within the drum, the consecutive states of vacuum and pressure very effectively aid to macerate the products, said drum being mechanically coupled with a motor which confers it a torque of rotation drive in one or the other direction, in the different periods of the treatment cycle.

In a conventional structure, said cylindric drum rests by its front part (which includes a tronco-conical portion which integrates the loading/unloading mouth) on rollers, mounted on a supporting structure, which are supported against a circumferential band of its side wall, and by its rear part the drum is coupled to means, linked to said structure, for its drive in rotation, guided, about a revolution axis, in both directions, the structure being hinged with respect to a bench and associated to means, such as fluid dynamic cylinders, to let it be tilted, so that said drum rotating motion can be carried out in different positions of said axis inclination.

In addition, said drum integrates on its internal face, a plurality of blades which define a series of oblong open receptacles, oriented as generatrices along the drum, said receptacles being filled with the meat, acting as spoons in one of the rotation directions, which provokes that the meat, during said step, is lifted and then let to fall by gravity on the rest of the meat mass which occupies the recess within the drum, from the higher part thereof, while in the opposite rotating direction, it slides on the inclined surface forming the external wall of said receptacles, being gently massaged. That is to say, during the treatment the action of a strong knocking the meat is matched with a gentle massage, all of it under conditions of temperature, pressure (cycles of vacuum and pressure) and internal environment of the chamber controlled at will.

Examples of this kind of machines appear disclosed in Spanish patents no 406,947 and 435,711, as well as in U.S. Pat. No. 4,791,705, all of them owned by the holder of this application of patent.

Other machines of the kind referred to are disclosed in Patents EP-A-0455611, SU-835973, WO-A-89/08982 and WO-A92/18011.

DESCRIPTION OF THE INVENTION

With respect to above background, the invention proposes a simplified supporting structure, reducing to the minimum the elements constituting it and its respective sections, the distribution of the loads having been optimized with respect to the structural supporting members as well when the drum rotates, with more or less brisk displacements of meat mass which generates unbalances in the whole of said drum, as in idle situation. When planning said supporting structure the steps of loading and unloading meat pieces with oblique drum inclinations and new displacement of the meat mass, to attenuate its effects have been analyzed. In addition, means for supporting and coupling the drum to said supporting structure have been provided which determine a minimization of the effects which tends to have a repercussion on the drum-bearing structure links, derived from possible eccentricities at the periphery of the drum (unavoidable because of its large diameter).

Otherwise, the driving means to produce the drum tilt are arranged with relation to said supporting structure so that a maximum profit of its performances is achieved.

Also the drum internal blades show a configuration which favours the macerating treatment explained and also facilitates an effective cleaning inside the drum.

Thus, said supporting structure is hinged on the front part of a bench or bottom constituted by a not very high substantially horizontal frame supported on the floor, on feet with means of elastic nature to absorb vibrations, so that hinged joints are defined with said bench, aligned according to a horizontal axis we shall call B close to the floor and orthogonal to the drum revolution axis, and at its rear part the structure is joined to a plate bearing the drum rotating motion driving and guiding means, said junction being carried out intercalating elastic elements, aligned according to an axis, designated as C, horizontal, orthogonal and secant or substantially close to said revolution axis A, behind the drum closed end, and there exists at each side of the drum a fluid dynamic cylinder lied by means of a first hinged joint to the rear part of said bench and by a second hinged Joint to the rear end of the structure at a point close to said axis C, said first hinged joint remaining aligned according to an horizontal axis D, close to the floor and orthogonal to said revolution axis A, the gap between the axis B and C being significantly larger that the gap between axis B and D, which allows that the cylinders adopt an inclined position, with which a best effectiveness thereof can be achieved with a shorter run of the stem of the fluid dynamic cylinder, with respect to that possible with another arrangement of mounting.

As for the drum blades, they are extended, regularity spaced, following a generatrix along a substantial portion of the internal face of the side wall of said drum and they are constituted by an asymmetric cross profile, inclined sideways, with a free, longitudinal, rounded edge delimited by flanks one of them forming a spoon-shaped recess and the other a slight pendent ramp. Said arrangement determines that said drum rotates in the direction said recess has at the front, the meat is catched by it and lifted up to the higher part of said drum, it falls again from said height to the bottom to start the new cycle, and when the drum rotates in the opposite direction, the meat pieces gently slide on said ramp and rounded edge, causing a massage friction between the meat pieces without lifting them.

Other characteristics of the invention shall best appear from the detailed explanation of an example of embodiment thereof which is disclosed below with reference to drawings in which the following has been illustrated:

SHORT DESCRIPTION OF THE DRAWINGS

EXPLANATION IN DETAIL OF AN EXAMPLE OF PREFERRED EMBODIMENT

Figure 1:
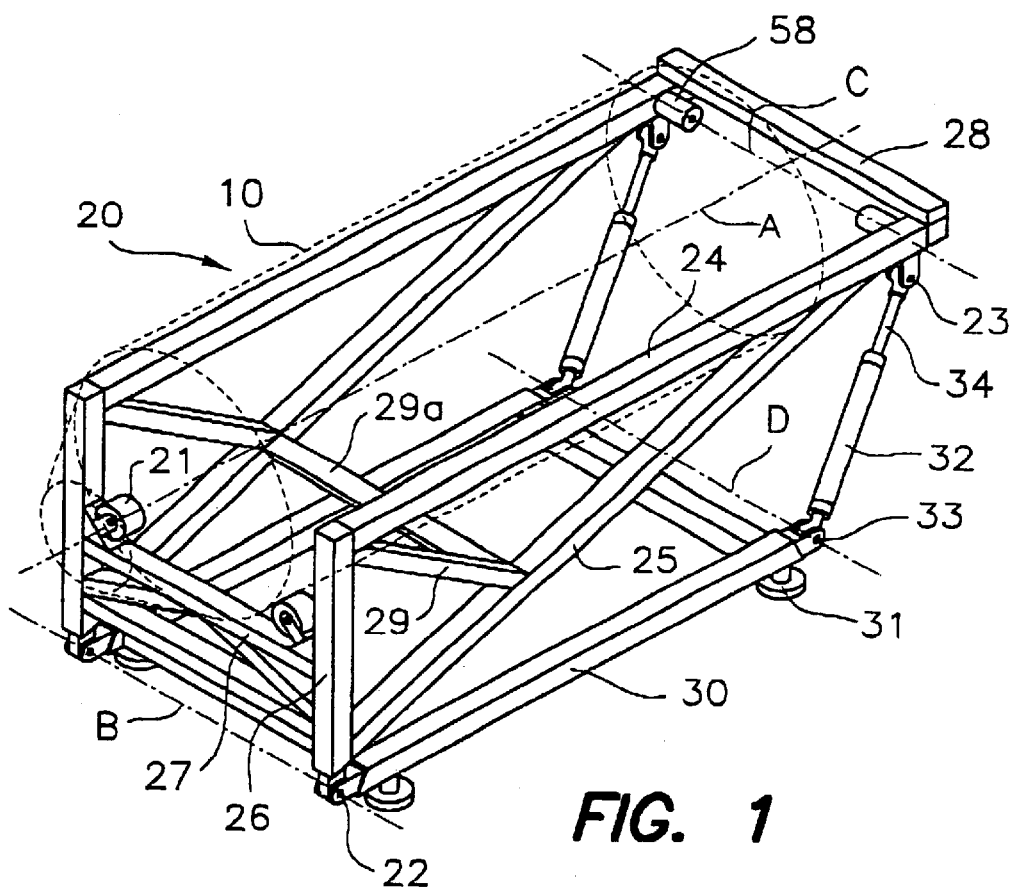
FIG. 1 shows in a schematic view in perspective, of the supporting structure according to the invention, its arrangement having been indicated in a dot line on the drum.

With reference to said drawings, the machine for processing meat pieces referred to up to now comprises a cylindrical drum (10), which has a side wall (11), a closed rear end (13) and an open front end (14) (delimited by a tronco-conical portion) for feeding meat pieces and for unloading them, integrating at said front end (14) a cover (40) with means for tight seal, said drum (10) resting by its front part on rollers (21), mounted on a supporting structure (20), which is supported against a circumferential band of said wall (11) and by its rear part the drum (10) is coupled to means, linked to said structure (20), for driving it in rotation, guided, about a revolution axis (A), in both directions, the structure (20) being hinged with respect to a bench (30) and associated to means, such as fluid dynamic cylinders (32) to have it be tilted, so that said rotatory motion of the drum (10) can be achieved in different positions of said axis (A) inclination.

Said drum (10) integrates on its internal face, a plurality of blades (12) for dragging and turning the meat and it comprises on the drum (10) wall (11) external face, a wrapping sleeve (15), of thermal conditioning and means for feeding a beat exchanging fluid within said sleeve (15).

According to the invention and as it can be clearly seen in FIGS. 1 to 5, said bench or bottom (30) is formed by a very low substantially horizontal frame, supported on the floor, and said supporting structure (20) has at its front part hinged joints (22) with the bench (30) aligned according to an horizontal axis (B), close to the floor and orthogonal to said revolution axis (A), and at its rear part, the structure (20) is joined to a plate (50) bearing said means for driving and guiding the rotatory motion of the drum (10), the junction being achieved by intercalating elastic elements (58), aligned according an horizontal, orthogonal and secant axis (C), or substantially close to the revolution axis (A) behind the closed end of the drum (10). At each side of said drum (10) a fluid dynamic cylinder (32) is linked by means of an hinged joint (33) to the rear part of said bench (30) and by means of a hinged joint (23) to the rear end of the structure (20) at a point close to said axis (C) , and it can be seen that the hinged joints (33) remain aligned according to a horizontal axis (D) close to the floor and orthogonal to said revolution axis (A), the gap between the axis (B) and (C) being significantly larger than the gap between the axis (B) and (D) so that the cylinders (32) adopt an inclined position.

Said structure (20) is symmetrical (see FIG. 1) with respect to a vertical plane containing the revolution axis (A) and comprises two sides, each of which has a substantially triangular configuration, with a joist (24) parallel to said revolution axis (A) with its rear end close to the axis (C), a diagonal bar (25) extending from a point close to said axis (C) up to a point close to the axis (B) and a prop (26) extending from a point close to said axis (B) up to said joist (24) substantially perpendicular to it, both sides being joined by means of at least front (27) and rear (28) cross members.

As it is shown in FIGS. 1 to 4, each side of said structure (20) comprises in addition, at least a tension member (29) which joins the front summit where the prop (26) and the joist (24) with the diagonal bar (25) and the points connecting with said bar. (25) of the end of each tension member (29) are connected by a transversal cross member (29a) which extends under the drum (10), clearly visible in FIG. 1.

Figure 2:
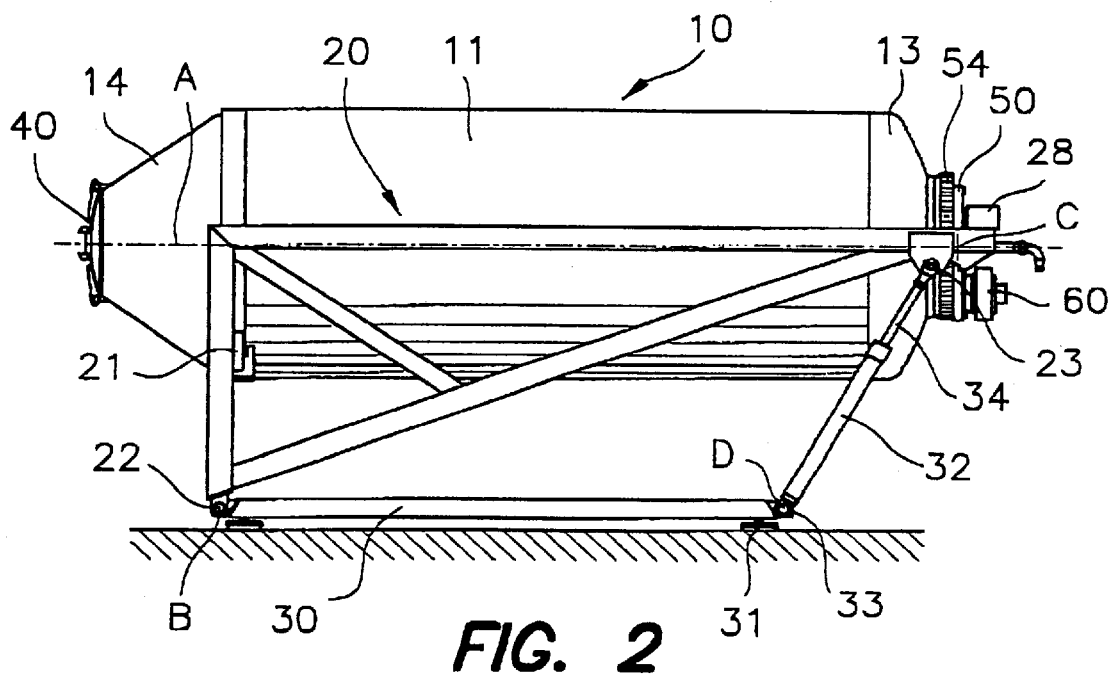
FIGS. 2 to 4 are schematic views, in side elevation of the drub arranged on the supporting structure of FIG. 1 in three positions: operation, loading and unloading, is respectively.
Figure 3:
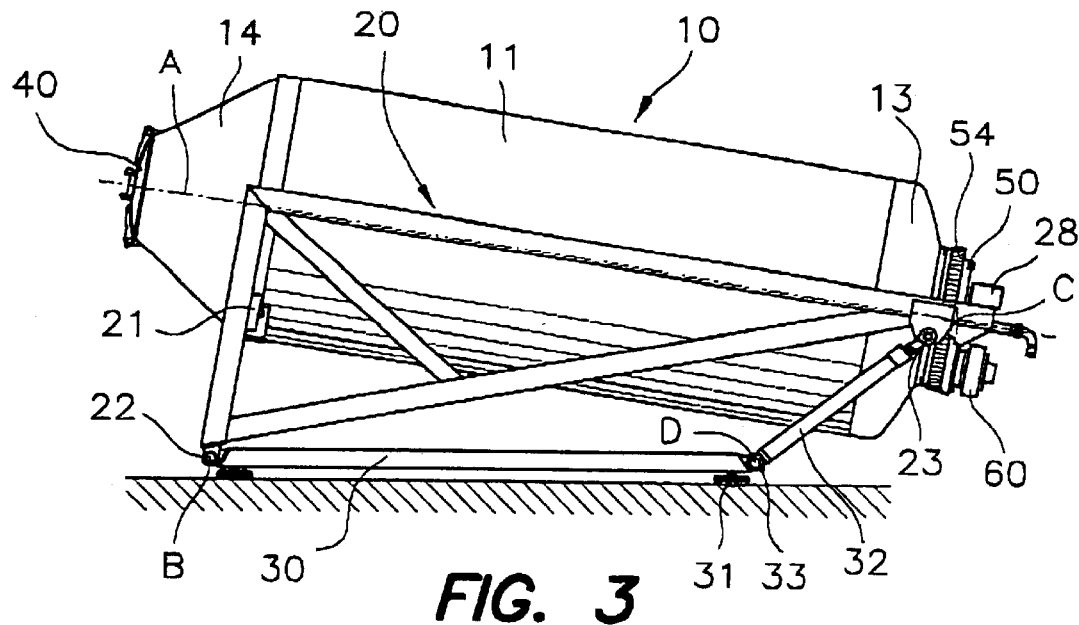
Figure 4:
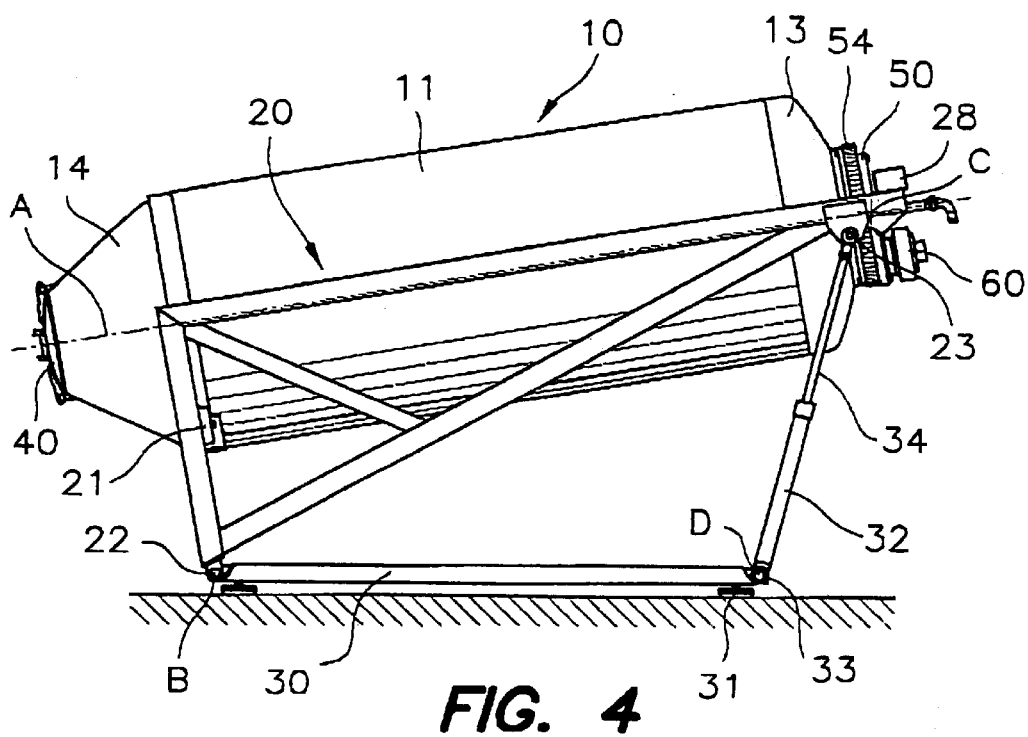

On their side, and as it is apparent in FIGS. 2 to 4, the rollers (21) are situated close to the ends of the cross member (27) and virtually aligned following said prop (26) with the hinging points (22) of the structure (20) at the front part of the bench (30).

Figure 5:
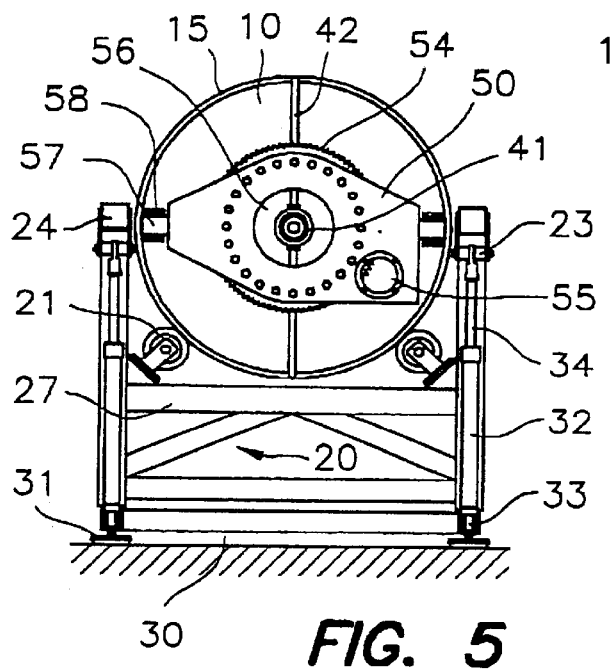
FIG. 5 is an elevation view by the rear part of the drum, where it is coupled to the supporting means, driving in rotation and routing within said drum and to its sleeve wrapping different fluids.
Figure 6:
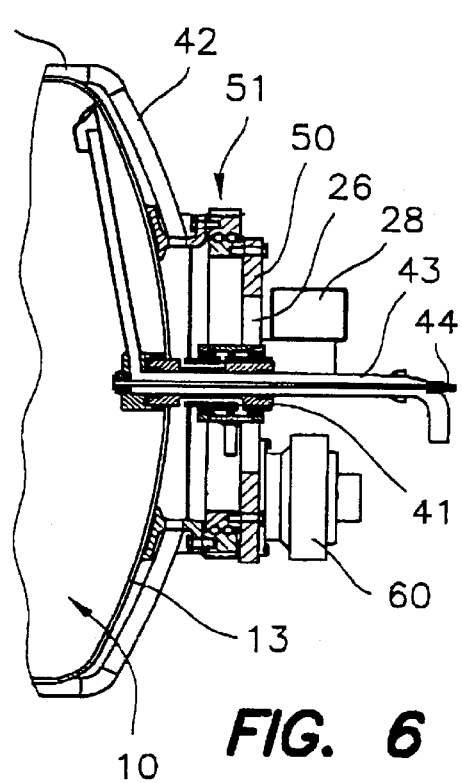
FIG. 6 is a part elevation cross sectional view, of the drum rear end indicating said means for driving in rotation and routing the fluids, in addition to detail a probe for temperature taking.
Figure 6A:
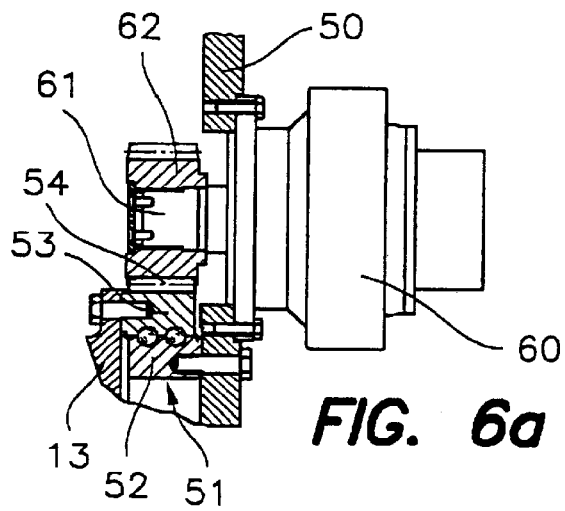
FIG. 6a is a detail, at larger scale, of the mechanism for driving and guiding the drum rotation, illustrated in FIG. 6.

With reference now to FIGS. 5, 6 and 6a, which describe the means for driving and guiding the rotatory motion of the drum (10), they consist in a large diameter bearing (51), the internal track (52) of which is integral with said supporting plate (50), and the external track (53) of which has a notched sector (54) formed on its periphery, coaxially integral with said closed end (13) of the drum (10). Said supporting plate (50) incorporates, in addition, an anchoring hole (55) for a motor (60) the exit shaft (61) of which bears a pinion (62) for driving said notched sector (54) and a opening (56), at a central portion of said supporting plate (50), through which a rotatory joint (41) is arranged for introducing and/or withdrawing one or more fluids to/from inside the motor (10) and to/from said sleeve (15). Also bolts (57) are provided to cooperate with said elastic elements (58) interposed, in the hinged joint of said plate (50) with sides of the structure (20).

Said rotatory joint (41), as illustrated in FIG. 5 is coaxially mounted at the closed end (13) of the drum (10) and comprises (see FIG. 6) three ways, two of them communicated with ducts (42) which link with said sleeve (15) and a third central duct (43) of access to the interior of the tank so that pressure/vacuum cycles become possible through it or to insert a gas for treatment, such as oxygen.

According to the invention, a thermal probe (44) has been also provided which reaches the interior of the drum (10) for controlling at any moment the internal temperature of the treatment chamber, said thermal probe (44) is arranged inserted through the central duct (43) of said rotatory joint (41).

Figure 7:
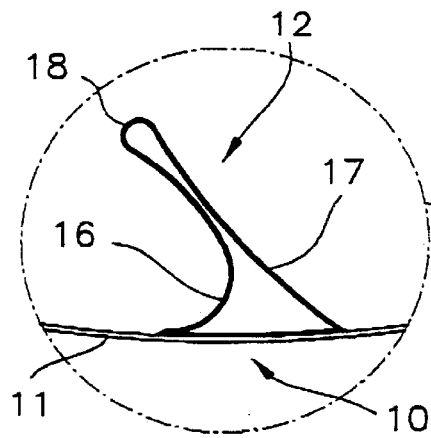
FIG. 7 is a part view, in perspective, of the internal blades of the drum, its configuration and reliability being seen in enlarged detail according to following explanation.

In FIG. 7 it can be seen that the blades (12) extend, regularly spaced, following a generatrix along a substantial portion of the internal face of the side wall (11) of the cylindric drum (10) and said blades have an asymmetrical cross profile, inclined sideways, with a longitudinal, rounded free edge (15), delimited by flanks forming one of them a spoon-shaped recess (16) and the other defining a ramp (17) having a slight pendent so that when said drum rotates towards said recess (16) direction in the front, the meat is catched by it and lifted up to the higher part of said drum (10), from which height it falls once again down the bottom for starting a new cycle, and when the drum (10) rotates in the opposite direction, the meat pieces gently slide on said ramp (17) causing a friction/massage with each other, without being lifted.

As shown in the drawings (FIGS. 2 to 4) said drum (10) ends in a tronco-conical portion by its front end (14) bearing an access door (40) and although the blades (12) have not been shown in details, they alternately extend until virtually the access/exit mouth of the drum by means of a warped end portion.

AS a man of the art shall be able to acknowledge, the aim of the hinged joint of said plate (50) to the structure (20) by means of the bolts (57) and the elastic elements (58) is to release the bearing (51) from strengths produced by possible eccentricities in the bearing race of the side wall (12) of the drum (10) on the rollers (21), increasing the useful life of said bearings (51).

On its side, as the gap between the axis B and C is significantly larger than the gap between the axis B and D, this allows that the cylinders (32) adopt an inclined position with which the travels thereof is optimized to achieve maximum and minimum inclinations.

What is claimed is:

1. Machine for processing meat pieces, the machine comprising
    a drum having a side wall, a closed rear end and an open front end for feeding and unloading the meat pieces, said open front end being provided with a cover, said drum resting at a front end portion on rollers mounted on a supporting structure and leaning against a circumferential band of said wall, and being coupled at a rear portion of the drum to a driving and guiding means linked to said structure for rotating the drum in opposite directions about a revolution axis, the structure being joint hinged with respect to a bench and associated with fluid dynamic cylinders for tilting the structure so that said rotating motion of the drum is carried out in different positions of inclination of said revolution axis, the drum being provided on an internal face with a plurality of blades for dragging and tumbling the meat,
    said bench being formed by a substantially horizontal low frame supported on the floor,
    said supporting structure being hinged at a front portion to the bench by hinged joints aligned according to a first horizontal axis close to the floor and perpendicular to a vertical plane containing said revolution axis,
    said rollers being placed substantially vertically above the hinged joints when the revolution axis is in a horizontal position,
    the structure being joined at a rear portion to a plate bearing said driving and guiding means for the rotatory motion of the drum, a junction between the structure and the plate being achieved by intercalating elastic elements aligned according to a second horizontal axis parallel to said first horizontal axis and in proximity to said revolution axis behind the closed end of the drum,
    at each side of said drum one of said fluid dynamic cylinders is linked by a hinged joint to the rear portion of said bench and by a hinged joint to the rear portion of the structure,
    the hinged joints being aligned according to a third horizontal axis located close to the floor and orthogonal to said revolution axis and said hinged joints being placed at points close to said horizontal, a distance between the first horizontal axis and the second horizontal axis being significantly larger than a distance between the first horizontal axis and the third horizontal axis so that the fluid cylinders adopt an upwards and rearwards inclined position.

2. Machine, according to claim 1, wherein an external face of the drum wall includes a wrapping jacket for thermal conditioning and means for feeding a heat exchanging fluid within said jacket.

3. Machine according to claim 1, wherein said structure is symmetrical with respect to a vertical plane containing the revolution axis and comprises two sides, each having a substantially triangular configuration with a joist parallel to said revolution axis up to a point close to the first a horizontal axis and a prop with its rear end close to the second horizontal axis, a diagonal bar extending from a point close to said second horizontal axis extending from a point close to said first horizontal axis up to said joist and extending substantially perpendicular to it, bot sides being joined by at least front and rear cross members.

4. Machine according to claim 3, wherein each side comrises in addition, at least one binding member which joins a front summit where the prop and the joist converge with the diagonal bar and in that points connecting with said bar of the end of each binding member are connected by a transversal cross member which extends under the drum.

5. Machine according to claim 3, wherein the rollers are situated close to the ends of the cross member and aligned following said prop with the hinging points of the structure at the front part of the bench.

6. Machine according to claim 2, wherein said means for driving and guiding the rotatory motion of the drum consist in a large diameter bearing, an internal track of which is integral with said supporting plate, and an external track of which has a toothed crown formed on its periphery, coaxially integral with said closed end of the drum, said supporting plate incorporates, in addition, an anchoring hole for a motor the exit shaft of which bears a pinion for driving said toothed crown and an opening, at a central portion of said supporting plate, through which a rotatory joint is arranged, connected to the rear end of the drum for at least one of introducing and withdrawing one or more fluids to and from inside the drum and to and from said jacket, bolts are provided to cooperate with said elastic elements in the hinged joint of said plate with sides of said structure.

7. Machine according to claim 6, wherein said rotatory joint is coaxially mounted at the closed end of the drum in three ways, two of the ways communicated with ducts which link with said jacket and a third central duct for access to the interior of the tank so that pressure/vacuum cycles become possible through the rotatory joint or to insert a gas for treatment.

8. Machine according to claim 7, wherein a thermal probe reaches the interior of the drum through the central duct of said rotatory joint.

9. Machine according to claim 1, wherein said drum is cylindrical and said blades extend, regularly spaced, following a generatrix along a substantial portion of the internal face of the side wall of the drum being constituted by an asymmetrical cross profile, inclined sideways, with a longitudinal, rounded edge delimited by flanks forming a spoon-shaped recess and defining a ramp having a slight pendent so that when said drum rotates towards said recess direction in the front, the meat is caught by it and lifted up to a higher part of said drum, from which height it falls once again down to the bottom to start a new cycle, and when the drum rotates in the opposite direction, the meat pieces gently slide on said ramp causing a friction/massage with each other, without being lifted.

10. Machine according to claim 9, wherein said drum ends in a tronco-conical portion at the front end bearing an access door and the blades alternately extending up to the access/exit mouth of the drum by a warped end portion.

* * * * *